Sept. 25, 1928.

G. W. BENEDICT 1,685,446

UNIVERSAL JOINT

Filed May 11, 1922

INVENTOR
GEORGE W. BENEDICT
By Paul & Paul
ATTORNEYS

Patented Sept. 25, 1928.

1,685,446

UNITED STATES PATENT OFFICE.

GEORGE W. BENEDICT, OF MINNEAPOLIS, MINNESOTA, ASSIGNOR TO MID-WEST MANUFACTURING COMPANY, OF MINNEAPOLIS, MINNESOTA, A CORPORATION OF SOUTH DAKOTA.

UNIVERSAL JOINT.

Application filed May 11, 1922. Serial No. 560,192.

This invention relates to improvements in universal joints and is more particularly directed to such joints of the ball and socket type. Broadly, these improvements are directed toward the production of a simple, efficient and inexpensively constructed joint. Provision is made in this improved joint so that torque may be transmitted from one member of the joint to the other.

The object therefore of this invention is to provide an improved universal joint.

Other objects of the invention will more fully appear from the following description and the accompanying drawings and will be pointed out in the annexed claim.

In the accompanying drawings, there has been disclosed a structure designed to carry out the objects of the invention, but it is to be understood that the invention is not confined to the exact features shown, as various changes may be made within the scope of the claim which follows.

Figure 4:
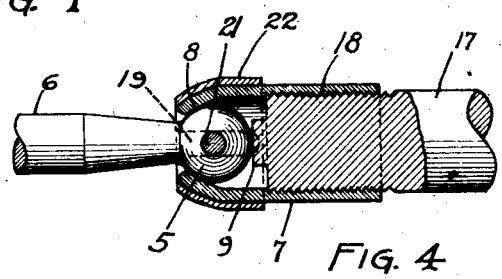
Figure 4 is a view similar to that of Figure 1 but showing the socket made of tubular sheet metal.

There is here shown a spheroidal element such as a metallic ball 5 having a preferably integral stem 6. The socket consists of a substantially cylindrical member such as the sleeve 7. The outer end portion of the sleeve is provided with an inwardly projecting portion, the interior surface of which is curved substantially to conform to the external surface of the ball in order to form a seat therefor permitting rotary movement thereof but preventing outward movement or withdrawal of the ball from its socket. In the form shown in Figure 1, the inwardly turned seat portions 8 are provided by a thickened portion of the sleeve; while, in the form shown in Figure 4, the sleeve is formed of tubular material the annular outer end portion of which is inwardly rolled to present the annular seat 8. The ball 5 is therefore held against outward movement. Means are provided in this novel device to prevent inward movement of the ball. Such means is conveniently provided by a boss or abutment 9 secured to the socket and extending toward the outer end thereof. In the form shown in Figure 2, this abutment is carried by a disk 11 which is peripherally threaded to be received in engagement with a similar threaded portion 12 of the sleeve 7. The side of this disk opposite to its abutment 9 is preferably provided with a groove 13 so that the abutment may be turned to its adjusted position as by means of a screw driver. In this last mentioned view, the device is shown as adapted for use with a nut wrench 14 as shown in dotted lines. The hub 15 of such a wrench may be received within the sleeve 7 and may be held in such position by means of a pin passed through transversely alined apertures 16. Or, as is shown in Figures 1 and 4, the abutment 9 may be integrally formed upon the end of the joint member such as a rod 17 having a threaded terminal portion 18 secured within the threaded portion of the sleeve.

Provision is made so that this joint may transmit torque. To that end, the slots 19 are milled out at diametrically opposed portions of the outer end of the socket sleeve 7. A pin 21 extends transversely through the ball and its projecting portions are adapted to be seated in the opposed slots 19. Preferably a cap 22 is forced on this outer end of the sleeve and functions both to close the slots and to prevent longitudinal movement of the pin thereby holding the pin 21 in its working position.

Figure 1:
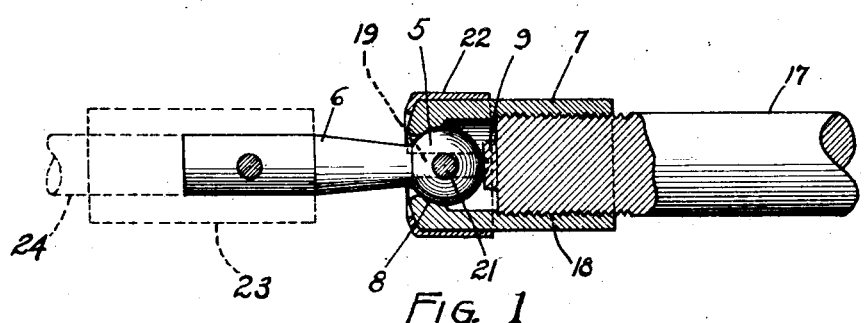
Figure 1 is a cross sectional view through the socket portion of the joint and showing the ball portion in side elevation.
Figure 2:
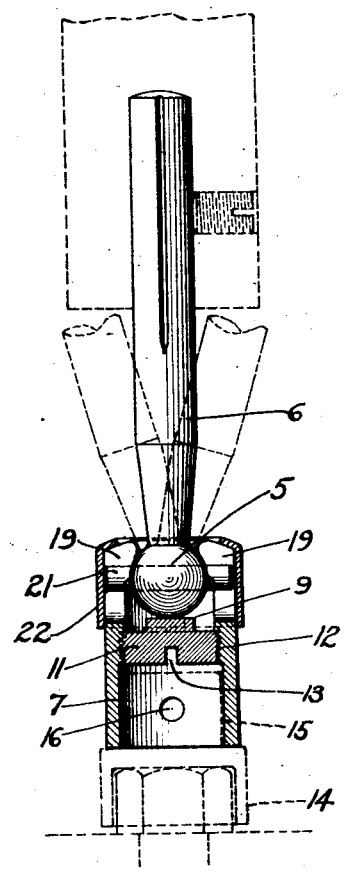
Figure 2 is a view similar to that shown in Figure 1 taken at a right angle thereto with the abutment member shown as a single unit.
Figure 3:
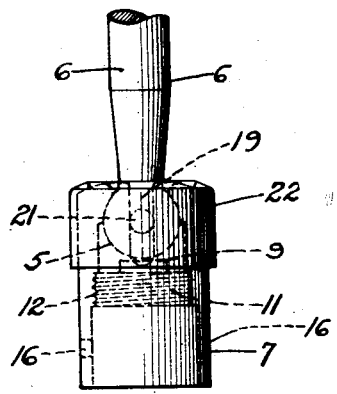
Figure 3 is a view in side elevation of the joint shown in Figure 2.

In Figures 1 and 2 there is suggested in dotted lines a conventional form of coupling 23 whereby the stem 6 may be coupled to a shaft 24.

Having thus described my invention what I claim as new and desire to secure by Letters Patent, is:

A universal joint including a cylindrical member and a spheroidal element adapted to be received within one end of the member, the outer end portion of said member having its interior surface curved substantially to conform to the external surface of the spheroidal element whereby outward movement of the element is prevented, said cylindrical member having an interiorly threaded portion, and a raised abutment fitting within the cylindrical member and adapted to be received in threaded engagement within said member and adjustable relatively to the interior curved surface of the socket to the spheroidal element to prevent inward movement of the spheroidal element and take-up wear and play in the parts.

In witness whereof I have hereunto set my hand this 5th day of May, 1922.

GEORGE W. BENEDICT.